(12) United States Patent
Lee et al.

(10) Patent No.: US 7,722,315 B2
(45) Date of Patent: May 25, 2010

(54) METHOD AND SYSTEM TO FACILITATE PREFERENTIALLY DISTRIBUTED RECUPERATED FILM COOLING OF TURBINE SHROUD ASSEMBLY

(75) Inventors: Ching-Pang Lee, Cincinnati, OH (US); Eric Alan Estill, Morrow, OH (US); James Harvey Laflen, Loveland, OH (US); Paul Hadley Vitt, Hamilton, OH (US); Michael Elliot Wymore, Madison, AL (US)

(73) Assignee: General Electric Company, Schenectady, NY (US)

( * ) Notice: Subject to any disclaimer, the term of this patent is extended or adjusted under 35 U.S.C. 154(b) by 805 days.

(21) Appl. No.: 11/565,253

(22) Filed: Nov. 30, 2006

(65) Prior Publication Data
US 2008/0127491 A1 Jun. 5, 2008

(51) Int. Cl.
*F01D 25/14* (2006.01)
(52) U.S. Cl. .................................... 415/115; 415/173.1
(58) Field of Classification Search ................. 415/115, 415/116, 173.1; 416/90 R, 91
See application file for complete search history.

(56) References Cited

U.S. PATENT DOCUMENTS

| 4,949,545 | A |   | 8/1990 | Shekleton |
|---|---|---|---|---|
| 5,217,348 | A |   | 6/1993 | Rup, Jr. et al. |
| 5,511,945 | A |   | 4/1996 | Glezer et al. |
| 6,139,257 | A | * | 10/2000 | Proctor et al. ............... 415/116 |
| 6,340,285 | B1 |   | 1/2002 | Gonyou et al. |
| 6,354,795 | B1 |   | 3/2002 | White et al. |
| 6,398,488 | B1 |   | 6/2002 | Solda et al. |
| 6,431,820 | B1 |   | 8/2002 | Beacock et al. |
| 6,431,832 | B1 |   | 8/2002 | Glezer et al. |
| 6,485,255 | B1 |   | 11/2002 | Care et al. |
| 6,779,597 | B2 |   | 8/2004 | DeMarche et al. |
| 6,984,100 | B2 |   | 1/2006 | Bunker et al. |
| 2007/0041827 | A1 | * | 2/2007 | Camus ....................... 415/116 |

FOREIGN PATENT DOCUMENTS

JP 2004138041 A * 5/2004

* cited by examiner

*Primary Examiner*—Richard Edgar
(74) *Attorney, Agent, or Firm*—William Scott Andes, Esq.; Armstrong Teasdale LLP

(57) ABSTRACT

A method of assembling a gas turbine engine includes coupling a turbine shroud assembly within the gas turbine engine. The turbine shroud assembly includes a shroud segment having a leading edge defining a forward face and a radial inner surface. A turbine nozzle is coupled to the turbine shroud assembly such that a gap is defined between an aft face of an outer band of the turbine nozzle and the forward face. A plurality of recuperated cooling openings are defined through the leading edge at an oblique inlet angle with respect to a centerline of the gap and between the forward face and the radial inner surface to direct cooling fluid through the leading edge to facilitate preferential cooling of the leading edge.

17 Claims, 6 Drawing Sheets

METHOD AND SYSTEM TO FACILITATE PREFERENTIALLY DISTRIBUTED RECUPERATED FILM COOLING OF TURBINE SHROUD ASSEMBLY

STATEMENT REGARDING FEDERALLY SPONSORED RESEARCH & DEVELOPMENT

The U.S. Government may have certain rights in this invention pursuant to contract number N00019-04-C-0093.

BACKGROUND OF THE INVENTION

This invention relates generally to gas turbine engines and, more particularly, to methods and systems for cooling integral turbine nozzle and shroud assemblies.

One known approach to increase the efficiency of gas turbine engines requires raising the turbine operating temperature. However, as operating temperatures are increased, the thermal limits of certain engine components may be exceeded, resulting in reduced service life and/or material failure. Moreover, the increased thermal expansion and contraction of components may adversely affect component clearances and/or component interfitting relationships. Consequently, cooling systems have been incorporated into gas turbine engines to facilitate cooling such components to avoid potentially damaging consequences when exposed to elevated operating temperatures.

It is known to extract, from the main airstream, air from the compressor for cooling purposes. To facilitate maintaining engine operating efficiency, the volume of cooling air extracted is typically limited to only a small percentage of the total main airstream. As such, this requires that the cooling air be utilized with the utmost efficiency in order to facilitate maintaining the temperatures of components within safe limits.

For example, one component that is subjected to high temperatures is the shroud assembly located immediately downstream of the high pressure turbine nozzle extending from the combustor. The shroud assembly extends circumferentially about the rotor of the high pressure turbine and thus defines a portion of the outer boundary (flow path) of the main gas stream flowing through the high pressure turbine. Gas turbine engine efficiency may be negatively affected by a fluctuation in turbine blade tip clearance measured between a radially outer surface of the turbine blade and a radial inner surface of the shroud assembly. During transient engine operation, turbine blade tip clearance is a function of the relative radial displacements of the turbine rotor and the shroud assembly. The turbine rotor typically has a larger mass than the stationary shroud system and, thus, during turbine operation, the turbine rotor typically has a slower thermal response than the shroud assembly. When the difference in the turbine rotor radial displacement and the shroud assembly radial displacement is too great, the blade tip clearance is increased, which may result in a reduction in engine efficiency.

Moreoever, during engine operation, a gap may be defined between a trailing edge of the high pressure turbine nozzle outer band and a leading edge of the adjacent shroud segment. Cooling air, including, without limitation, nozzle leakage and/or purge flow, enters the gap and flows into the main gas stream channeled through the high pressure turbine. Cooling air is generally provided by a row of axially aligned cooling openings positioned in an outer band trailing edge that are directed towards the shroud leading edge forward face to facilitate cooling the end faces and purging the gap. Because known nozzle outer band trailing edges and shroud leading edges have a simple 90° corner, the gap opens directly into the main gas stream. During engine operation, as the main gas stream flows through the nozzle vanes, a circumferential gas pressure variation may be created downstream from the vane trailing edge. This circumferential gas pressure variation may cause localized hot gas ingestion into the gap between the outer band and the shroud segment. As a result, cooling air flowing through the gap may not effectively cool the downstream shroud segement.

BRIEF DESCRIPTION OF THE INVENTION

In one aspect, a method of assembling a gas turbine engine is provided. The method includes coupling a turbine shroud assembly within the gas turbine engine. The turbine shroud assembly includes a shroud segment having a leading edge defining a forward face and a radial inner surface. A turbine nozzle is coupled to the turbine shroud assembly such that a gap is defined between an aft face of an outer band of the turbine nozzle and the forward face. A plurality of recuperated cooling openings are defined through the leading edge at an oblique inlet angle with respect to a centerline of the gap and between the forward face and the radial inner surface to direct cooling fluid through the leading edge to facilitate preferential cooling of the leading edge.

In another aspect, a turbine nozzle and shroud assembly for a gas turbine engine is provided. The turbine nozzle and shroud assembly includes a shroud segment including a leading edge defining a forward face and a radial inner surface. The shroud segment further defines a plurality of recuperated cooling openings extending obliquely through the leading edge between the forward face and the radial inner surface. A turbine nozzle including an outer band having a trailing edge defining an aft face of said outer band is upstream from the shroud segment and coupled with the shroud segment such that a gap is defined between the aft face and the forward face. The gap is configured to direct cooling fluid towards a hot gas flow path flowing through the gas turbine engine.

In yet another aspect, a cooling system for a gas turbine engine is provided. The gas turbine engine includes a shroud segment having a leading edge defining a forward face, and a turbine nozzle including an outer band having a trailing edge defining an aft face. The turbine nozzle is positioned upstream of the shroud segment and coupled with a turbine shroud assembly such that a gap is defined between the aft face and the forward face. The gap is configured to direct cooling fluid towards a hot gas flow path flowing through the gas turbine engine. The cooling system configured to direct a portion of cooling fluid through a plurality of recuperated cooling openings extending through the leading edge at an oblique inlet angle with respect to a centerline of the gap and between the forward face and the radial inner surface to facilitate preferential cooling of the leading edge.

DETAILED DESCRIPTION OF THE INVENTION

The present invention provides a turbine shroud cooling system for minimizing hot gas ingestion into a gap defined between a trailing edge of the high pressure turbine nozzle and a leading edge of the adjacent shroud segment. As a result, the turbine shroud cooling system minimizes or cools local hot gas temperature spots on the radial inner surface at or downstream from the shroud leading edge. Further, by preferentially distributing recuperated cooling openings circumferentially about the leading edge of the shroud segment, the turbine shroud cooling system facilitates convection cooling the shroud leading edge as well as film cooling a radial inner surface of the shroud segment.

Although the present invention is described below in reference to its application in connection with cooling a shroud assembly of an aircraft gas turbine, it should be apparent to those skilled in the art and guided by the teachings herein provided that with appropriate modification, the cooling system or assembly of the present invention can also be suitable to facilitate cooling other turbine engine components, such as, but not limited to, the nozzle and/or vane sections.

Further, references to the term "fluid" throughout the specification and in the claims are to be understood to refer to any suitable cooling material or medium having fluid properties suitable for use in combination with the shroud cooling assembly as described herein including, without limitation, a suitable gas, air and/or liquid. Thus, although the shroud cooling assembly is described herein as directing cooling air through the turbine nozzle and shroud assembly, it should be apparent to those skilled in the art and guided by the teachings herein provided that any suitable fluid may be used in cooperation with the shroud cooling assembly.

Figure 1:
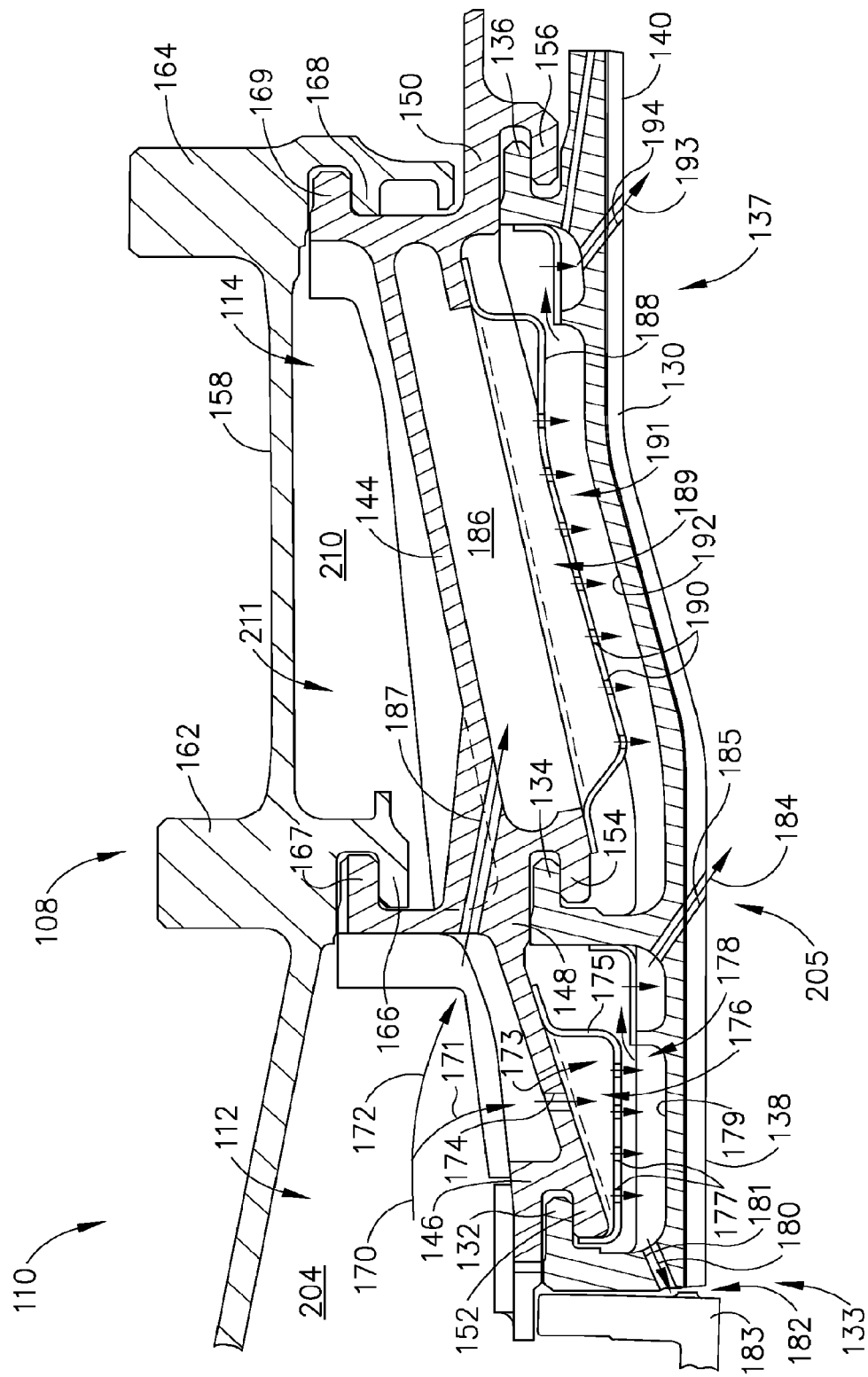
FIG. 1 is a side view of an exemplary shroud assembly schematically illustrating high pressure cooling air flow through the shroud assembly.
Figure 2:
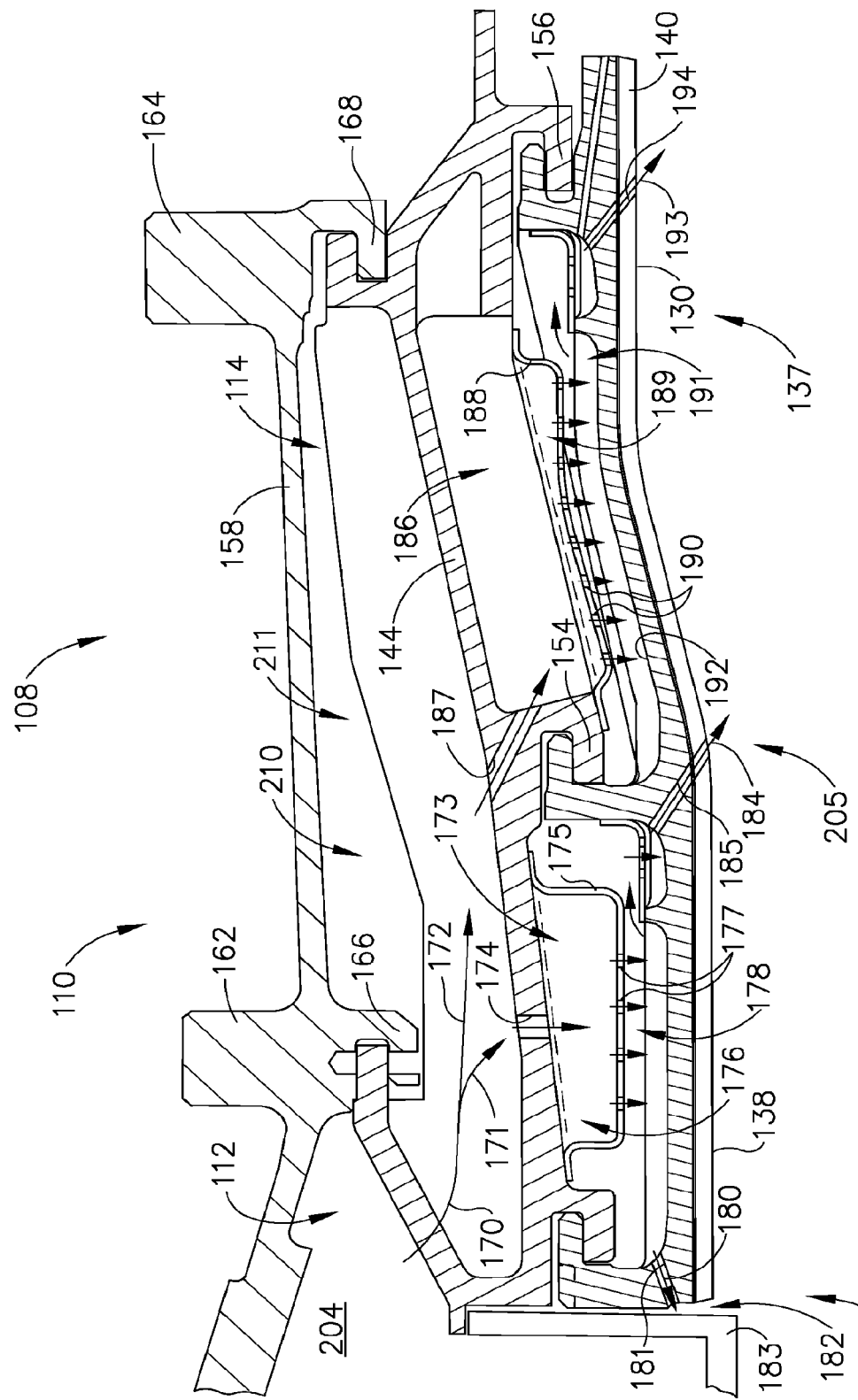
FIG. 2 is a side view of an alternative shroud assembly schematically illustrating high pressure cooling air flow through the shroud assembly.

FIG. 1 is a side view of an exemplary shroud assembly schematically illustrating high pressure cooling air flow through the shroud assembly. FIG. 2 is a side view of an alternative shroud assembly schematically illustrating high pressure cooling air flow through the shroud assembly. To facilitate controlling shroud assembly thermal response and/or shroud assembly displacement during transient engine operation, in the exemplary embodiment, a turbine engine cooling assembly 108 includes a shroud assembly, generally indicated as 110, for a high pressure turbine section 112 and a low pressure turbine section 114 of a gas turbine engine. It should be apparent to those skilled in the art and guided by the teachings herein provided that turbine engine cooling assembly 108 may be suitable to facilitate cooling other sections of the gas turbine engine, such as, but not limited to, a nozzle section and/or a vane section.

Shroud assembly 110 includes turbine engine cooling components in the form of shroud segments 130. Each shroud segment 130 includes a forward mounting hook 132 at a circumferential leading edge 133 of shroud segment 130. Shroud segment 130 also includes a midsection mounting hook 134 and an aft mounting hook 136 adjacent to a circumferential trailing edge 137 of shroud segment 130.

A plurality of shroud segments 130 are arranged circumferentially in a generally known fashion to form an annular segmented shroud. Shroud segments 130 define an annular clearance between high pressure turbine blades (not shown) and a radial inner surface 138 of a high pressure turbine section of shroud segments 130, and between low pressure turbine blades (not shown) and a radial inner surface 140 of a low pressure turbine section of shroud segment 130. A plurality of segmented shroud supports 144 interconnect shroud segments 130. Each shroud support 144 circumferentially spans and supports adjacent shroud segments 130. In alternative embodiments, shroud supports 144 are modified to support any suitable number of shroud segments 130 less than or greater than two shroud segments 130. In the exemplary embodiment, shroud assembly 110 includes twenty-six (26) shroud segments 130 and thirteen (13) shroud supports 144, although any suitable number of shroud segments 130 and/or shroud supports 144 may be utilized in alternative embodiments.

Each shroud support 144 includes a forward section 146, a midsection 148 and an aft section 150 that form respective forwardly projecting hangers 152, 154 and 156. Mounting hooks 132, 134 and 136 are received by cooperating hangers 152, 154 and 156, respectively, in tongue-in-groove, or hook-in-hanger, interconnections such that shroud support 144 supports respective shroud segments 130.

Shroud assembly 110 includes an annular shroud ring structure 158 that in turn maintains shroud supports 144 in a desired position. In one embodiment, shroud ring structure 158 is a one-piece, continuous annular shroud ring structure. A radial position of each shroud support 144, as well as of each shroud segment 130, is closely controlled by only two annular position control rings 162 and 164 formed on shroud ring structure 158. In contrast to conventional shroud ring structures, to facilitate reducing or limiting a weight of shroud assembly 110, shroud ring structure 158 includes only two position control rings 162 and 164. A midsection position control ring 162 includes an axially forwardly projecting hanger 166 that receives and/or cooperates with a rearwardly projecting mounting hook 167 formed by support structure midsection 148 in a first circumferential tongue-in-groove or hook-in-hanger interconnection. An aft position control ring 164 includes an axially forwardly projecting hanger 168 that receives and/or cooperates with a rearwardly projecting mounting hook 169 of support structure aft section 150 in second circumferential tongue-in-groove or hook-in-hanger interconnection.

In the exemplary embodiment, hangers 166 and/or 168 are in direct axial alignment, i.e., aligned generally in the same radial plane, with respective hanger 154 and hanger 156 to facilitate maximizing the radial support and/or radial position control provided to shroud support 144 and, thus, corresponding shroud segments 130. This alignment orientation facilitates increasing the rigidity of the entire shroud support assembly. In an alternative embodiment, shown in FIG. 2, hanger 166 and/or hanger 168 are in an offset axial alignment, i.e., not aligned generally in the same radial plane, with respective hanger 154 and hanger 156. In the exemplary embodiment, shroud ring structure 158 is bolted to the combustor case (not shown) at an aft end of shroud ring structure 158. Shroud ring structure 158 is cantilevered away from leading edge 133 at the combustor case interface. As such, midsection position control ring 162 is positioned several inches away from the combustor aft flange (not shown), and is thereby divorced from any non-uniform circumferential variations in radial deflection in the combustor case.

In the exemplary embodiment, high pressure cooling air 170 is extracted from a compressor (not shown) positioned upstream of shroud assembly 110. A first portion 171 of high pressure cooling air 170 extracted from the compressor facilitates cooling high pressure turbine section 112. A second portion 172 of high pressure cooling air 170 extracted from the compressor facilitates cooling low pressure turbine section 114. Referring further to FIG. 1, directional arrows corresponding to first portion 171 and second portion 172 illustrate at least a portion of a flow path of first portion 171 of high pressure cooling air 170 through a high pressure turbine section active convection cooling zone 173 and second portion 172 of high pressure cooling air 170 through a low pressure turbine section active convection cooling zone 186 (described below), respectively.

In this embodiment, first portion 171 of high pressure cooling air 170 is metered into a first or high pressure turbine section active convection cooling zone 173. More specifically, first portion 171 of high pressure cooling air 170 is metered through at least one high pressure turbine section (HPTS) feed hole 174 defined in shroud support 144. First portion 171 of high pressure cooling air 170 impinges against a pan-shaped HPTS impingement baffle 175 positioned within high pressure turbine section active convection cooling zone 173. Baffle 175 is coupled to shroud support 144 and thus at least partially defines an upper HPTS cavity or plenum 176. First portion 171 of high pressure cooling air 170 is then metered through a plurality of perforations 177 formed in impingement baffle 175 as cooling air into a lower HPTS cavity or plenum 178 defined in shroud segment 130, wherein the cooling air impinges against a backside 179 of shroud segment 130. A portion, such as spent impingement cooling air 180, of high pressure cooling air exits plenum 178 through a plurality of forwardly directed cooling openings 181 defined at, or near, shroud segment leading edge 133 configured to facilitate purging a gap 182 defined between high pressure turbine nozzle outer band 183 and shroud segment leading edge 133. A portion 184 of high pressure cooling air is metered through a plurality of rearwardly directed cooling openings 185 defined in shroud segment 130 to facilitate film cooling radial inner surface 138 and/or 140. Spent impingement cooling air 180 of high pressure cooling air exiting cooling openings 181 facilitates preventing or limiting hot gas injection or recirculation into shroud assembly 110 at leading edge 133.

Second portion 172 of high pressure cooling air 170 extracted from the compressor facilitates cooling low pressure turbine section 114. In this embodiment, second portion 172 of high pressure cooling air 170 is metered into a second or low pressure turbine section active convection cooling zone 186. More specifically, second portion 172 of high pressure cooling air 170 is metered through at least one low pressure turbine feed hole 187 defined in shroud support 144. Second portion 172 of high pressure cooling air 170 impinges against a pan-shaped low pressure turbine section (LPTS) impingement baffle 188 positioned within low pressure turbine section active convection cooling zone 186. Baffle 188 is coupled to shroud support 144, and thus at least partially defines an upper LPTS cavity or plenum 189. Second portion 172 of high pressure cooling air 170 is then metered through perforations 190 defined in impingement baffle 188 and into a lower LPTS cavity or plenum 191 wherein high pressure cooling air impinges against a backside 192 of shroud segment 130. Cooling air 193 exits plenum 191 through a plurality of rearwardly directed cooling openings 194 defined through shroud segment 130, to facilitate film cooling radial inner surface 140 of trailing edge 137 of shroud segment 130 downstream.

As shown in FIG. 1, high pressure cooling air 170 is initially directed into a duct 204 defined at least partially between high pressure turbine nozzle outer band 183 and the portion of shroud ring structure 158 forming midsection position control ring 162. High pressure cooling air 170 is separated within duct 204 into first portion 171, and into second portion 172, as high pressure cooling air 170 is directed through duct 204. First portion 171 of high pressure cooling air 170 is metered through HPTS feed holes 174 into active convection cooling zone 173 and into plenum 178 to facilitate impingement cooling in high pressure turbine section 112. Spent impingement cooling air 180 exits shroud segment 130 through shroud segment leading edge cooling openings 181 to facilitate purging gap 182 defined between high pressure turbine nozzle outer band 183 and shroud segment 130, and/or through cooling openings 185 defined at a trailing end 205 of high pressure turbine section 112 to facilitate film cooling radial inner surface 138 and/or 140 of shroud segment 130.

Second portion 172 of high pressure cooling air 170 is directed into second active convection cooling zone 186 that is defined at least partially between shroud support 144 and shroud segment 130, and between midsection position control ring 162 and aft position control ring 164. Second portion 172 of high pressure cooling air 170 facilitates cooling low pressure turbine section 114. In one embodiment, second portion 172 of high pressure cooling air 170 is metered through a plurality of low pressure turbine feed holes 187 defined in shroud support 144. More specifically, second portion 172 of high pressure cooling air 170 is metered directly into active convection cooling zone 186 to facilitate shroud segment impingement cooling in low pressure turbine section 114, such that cooling air bypasses a third region 210 defining an inactive convection cooling zone 211 between shroud support 144 and shroud ring structure 158, and between midsection position control ring 162 and aft position control ring 164. Spent impingement cooling air exits shroud segment 130 through cooling openings 194 defined at or near trailing edge 137 of shroud segment 130.

In the flow path illustrated in FIG. 1, high pressure turbine section active convection cooling zone 173 and/or low pressure turbine section active convection cooling zone 186 are directly and actively cooled. Low pressure turbine section inactive convection cooling zone 211 is inactive, i.e., no high pressure cooling air flows through inactive convection cooling zone 211. Thus, a thermal response within inactive convection cooling zone 211 to environmental conditions created during transient engine operation is reduced and/or retarded. As a result, transient displacement of midsection position control ring 162 and/or aft position control ring 164 is also reduced and/or retarded.

In the alternative embodiment shown in FIG. 2, high pressure cooling air 170 is directed into duct 204 defined at least partially between high pressure turbine nozzle outer band 183 and shroud ring structure 158 forming midsection position control ring 162. High pressure cooling air 170 is separated into first portion 171 and second portion 172. First portion 171 of high pressure cooling air 170 is metered through HPTS feed hole(s) 174 into high pressure turbine section active convection cooling zone 173 at least partially defining plenum 176 and plenum 178 to facilitate shroud segment impingement cooling in high pressure turbine section 112. Spent impingement cooling air 180 exits shroud segment 130 through shroud segment leading edge cooling openings 181 to facilitate purging gap 182 between high pressure turbine nozzle outer band 183 and shroud segment 130 and/or through cooling openings 185 defined at trailing end 205 of high pressure turbine section 112 to facilitate film cooling radial inner surface 138 and/or 140.

Second portion 172 of high pressure cooling air 170 is directed into low pressure turbine section active convection cooling zone 186 defined at least partially between shroud support 144 and shroud segment 130, and between midsection position control ring 162 and aft position control ring 164 to facilitate cooling low pressure turbine section 114. In one embodiment, second portion 172 of high pressure cooling air 170 is metered through a plurality of low pressure turbine feed holes 187 defined through shroud support 144. Second portion 172 of high pressure cooling air 170 is metered directly into low pressure turbine section active convection cooling zone 186 at least partially defining plenum 189 and plenum 191 to facilitate shroud segment impingement cooling in low pressure turbine section 114. Spent impingement cooling air 193 exits shroud segment 130 through cooling openings 194 defined at or near trailing edge 137 of shroud segment 130.

The shroud cooling assembly as shown in FIGS. 1 and 2 directs high pressure cooling air directly into high pressure turbine section active convection cooling zone 173 and/or low pressure turbine section active convection cooling zone 186 through respective feed hole(s) 174 and feed hole(s) 187.

In the shroud cooling assembly as shown in FIGS. 1 and 2, high pressure cooling air is not metered or directed through low pressure turbine section inactive convection cooling zone 211. As a result, the components defining low pressure turbine section inactive convection cooling zone 211 respond relatively slower to thermal conditions and/or environments during transient engine operation than the components defining an active convection cooling zone within conventional shroud cooling assemblies. This slower response to thermal conditions and/or environments facilitates relatively slower transient displacement of midsection position control ring 162 and/or aft position control ring 164.

Thus, by bypassing the low pressure turbine section shroud ring structure, the high pressure cooling air flow paths shown in FIGS. 1 and 2 facilitate reducing and/or retarding the transient thermal response and/or displacement of the shroud segment during transient engine operation. The slower response further facilitates improved blade tip clearance and turbine engine efficiency.

Figure 3:
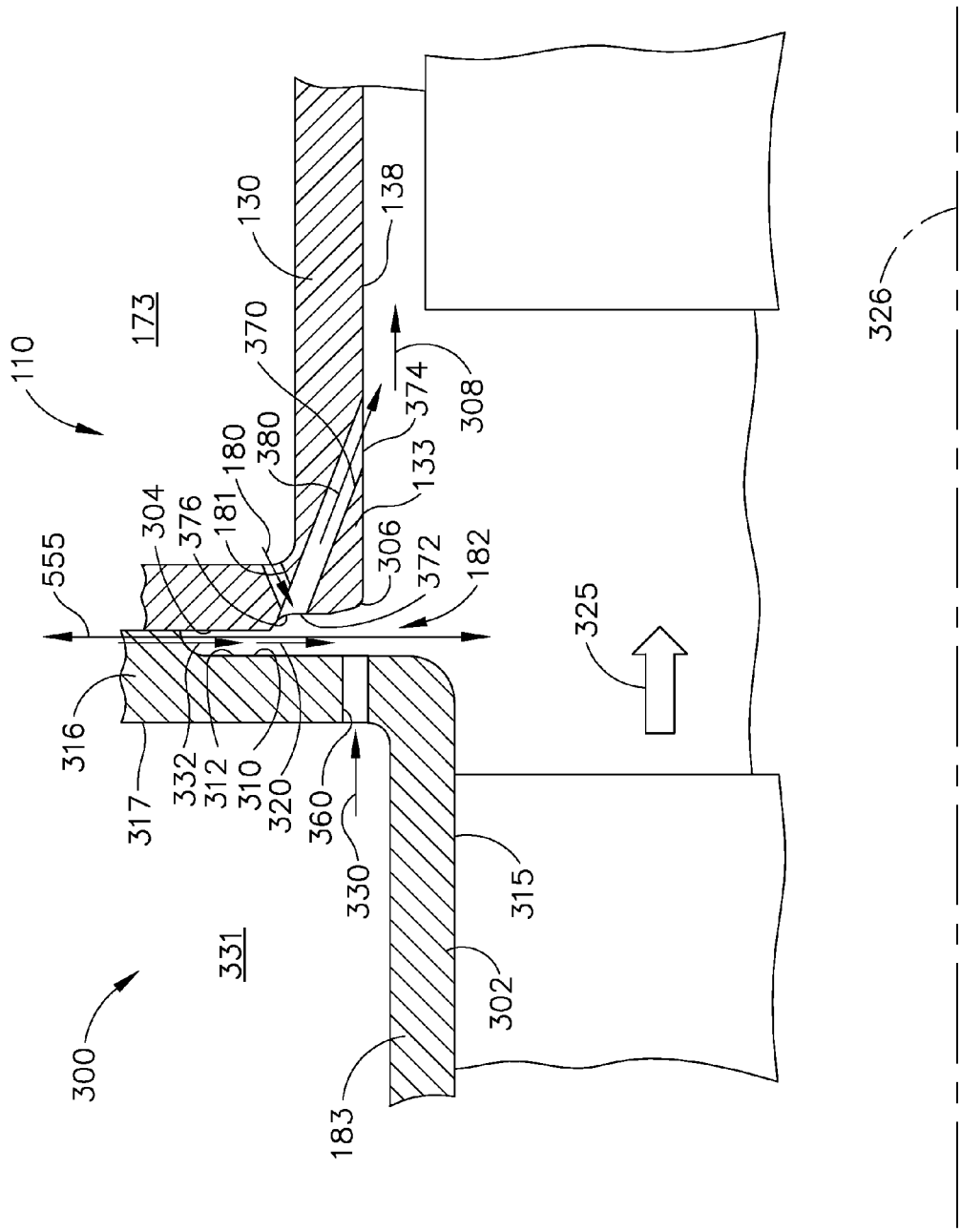
FIG. 3 is an enlarged schematic sectional view of a gap defined between an exemplary turbine nozzle and shroud assembly shown in FIG. 1 or 2.
Figure 4:
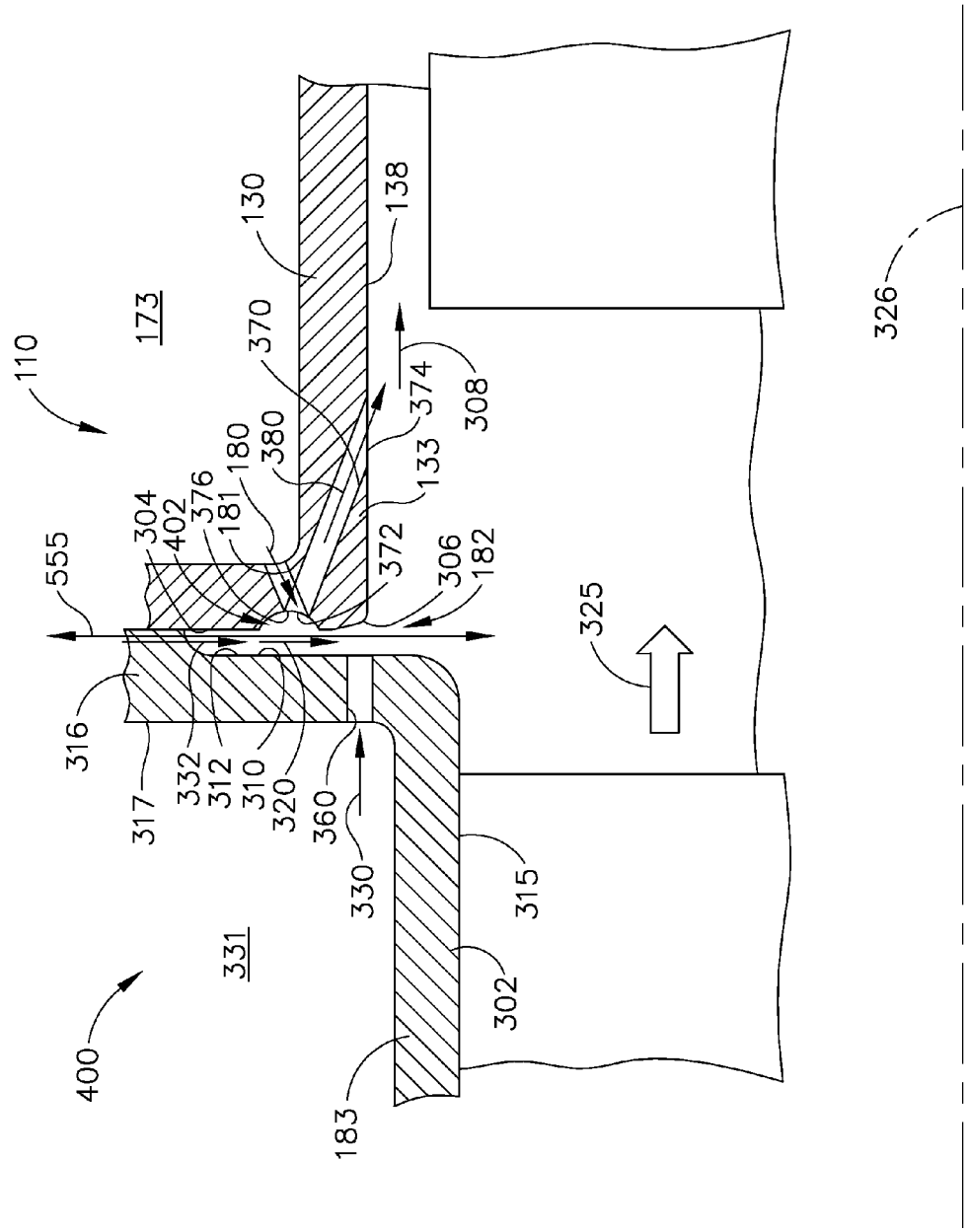
FIG. 4 is an enlarged schematic sectional view of a gap defined between an alternative exemplary turbine nozzle and shroud assembly.

FIG. 3 is an enlarged schematic sectional view of an exemplary turbine nozzle and shroud assembly 300 that includes shroud assembly 110, as shown in FIG. 1 or 2, and a turbine nozzle 302 coupled to shroud assembly 110. FIG. 4 is an enlarged schematic sectional view of an alternative exemplary turbine nozzle and shroud assembly 400 that includes shroud assembly 110, as shown in FIG. 1 or 2, and turbine nozzle 302 coupled to shroud assembly 110.

Referring further to FIG. 3, turbine nozzle and shroud assembly 300 includes a shroud assembly similar to shroud assembly 110, shown in FIGS. 1 and 2, and components of turbine nozzle and shroud assembly 300 that are identical to components of shroud assembly 110 are identified in FIG. 3 using the same reference numbers. Gap 182 is defined at an interface between outer band 183 of upstream turbine nozzle 302 and a downstream adjacent shroud assembly 110 including shroud segment 130. In the exemplary embodiment, turbine nozzle 302 is positioned upstream of shroud segment 130 and is coupled to shroud segment 130 to form turbine nozzle and shroud assembly 300 for a gas turbine engine.

Shroud segment leading edge 133 defines a forward face 304 of shroud segment 130. In the exemplary embodiment, forward face 304 includes a corner portion 306 that partially defines gap 182. Moreover, corner portion 306 is configured to facilitate forming or developing a film cooling layer, generally represented by a direction arrow 308, at, adjacent to, or near a radial inner surface 138, 140 of shroud segment 130, as described in greater detail below.

Outer band 183 has a trailing edge 310 that defines an aft face 312 of outer band 183. When turbine nozzle 302 is coupled to shroud segment 130, gap 182 is at least partially defined between aft face 312 and forward face 304. In the exemplary embodiment, outer band 183 includes a radial inner surface 315 and an aft flange 316. Aft flange 316 defines an upstream forward face 317 and at least a portion of trailing edge 310 defining aft face 312.

Gap 182 enables cooling air 320 to flow radially inwardly toward a combustion gases or hot gas flow path that follows a generally axial direction represented by arrow 325. Hot gas flow path 325 flows generally parallel to a central axis 326 defined by the gas turbine engine. Cooling air 320 may include spent turbine nozzle cooling air 330 exiting a turbine nozzle active convection cooling zone 331 that is at least partially defined by outer band 183, leakage air 332 directed from a duct 204 (shown in FIG. 1) that is at least partially defined between turbine nozzle 302 and shroud assembly 110, including shroud segment 130, and/or spent impingement cooling air 180 exiting active convection cooling zone 173 defined between shroud segment 130 and a cooperating shroud support 144 (shown in FIG. 1).

In the exemplary embodiment, a plurality of discharge openings 360 are defined through aft face 312 of trailing edge 310. As shown in FIG. 3, each discharge opening 360 extends through aft flange 316 between aft flange forward face 317 and aft face 312. Discharge openings 360 are configured to meter the flow of spent turbine nozzle cooling air 330 into gap 182. In one embodiment, discharge openings 360 are oriented generally parallel to central axis 326 and/or to the hot gas flow path 325 flowing through the gas turbine engine. In this embodiment, discharge openings 360 are configured to direct spent turbine nozzle cooling air 330 towards corner portion 306 to facilitate forming film cooling layer 308.

Figure 5:
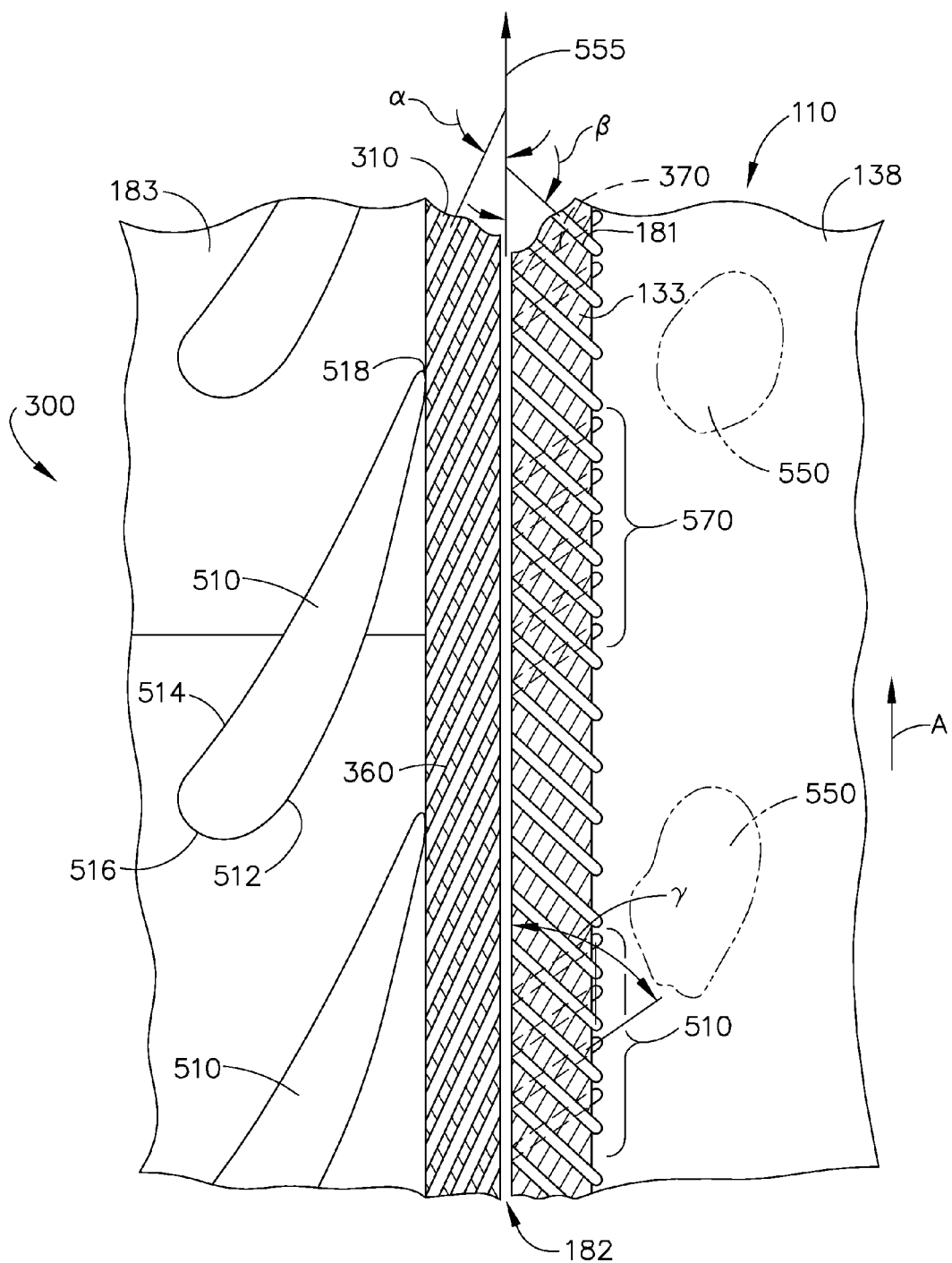
FIG. 5 is a plan view of the turbine nozzle and shroud assembly shown in FIG. 3, illustrating an exemplary cooling opening pattern.

Referring further to FIG. 3, a plurality of recuperated cooling openings 370 are defined through shroud segment 130. More specifically, recuperated cooling openings 370 are defined through leading edge 133 between forward face 304 and radial inner surface 138 of shroud segment 130. As shown in FIG. 3, each recuperated cooling opening 370 includes an inlet 372 defined within forward face 304 and a discharge 374 defined within radial inner surface 138. A discharge 376 of each forwardly directed cooling opening 181 is defined within forward face 304 such that forwardly directed cooling opening discharges 376 generally alternate with recuperated cooling opening inlets 372, as shown in FIG. 5.

FIG. 4 illustrates an alternative exemplary embodiment of a turbine nozzle and shroud assembly. In the embodiment illustrated in FIG. 4, turbine nozzle and shroud assembly 400 is substantially similar to turbine nozzle and shroud assembly 300 shown in FIG. 3. As such, components illustrated in FIG. 4 that are identical to components illustrated in FIG. 3 are identified in FIG. 4 using the same component reference number.

In the alternative exemplary embodiment, a circumferential gap plenum 402 is defined on forward face 304 and each recuperated cooling opening 370 includes an inlet 372 defined within gap plenum 402, as shown in FIG. 4. In this alternative embodiment, each forwardly directed cooling opening discharge 376 is also defined within gap plenum 402 such that forwardly directed cooling opening discharges 376 generally alternate with recuperated cooling opening inlets 372.

Referring to FIGS. 3 and 4, forwardly directed cooling openings 181 are defined in shroud segment leading edge 133 and are configured to meter spent impingement cooling air 180 into gap 182. In the exemplary embodiment, cooling openings 181 are radially outward from discharge openings 360 formed in aft face 312, as shown in FIGS. 3 and 4. As spent impingement cooling air 180 exits cooling openings 181 into gap 182, spent impingement cooling air 180 mixes with leakage air 332 directed from duct 204 (shown in FIG. 1). In the exemplary embodiment, as mixed cooling air 320 exits gap 182, spent turbine nozzle cooling air 330 exiting discharge openings 360 through aft face 312, as shown in FIG. 3, is directed towards corner portion 306 to facilitate forming film cooling layer 308 on radial inner surface 138. Spent turbine nozzle cooling air 330 mixes with and/or directs a portion of mixed cooling air 320 towards corner portion 306 and along radial inner surface 138, 140 of shroud segment 130 to facilitate film cooling shroud segment 130. Further, by directing spent turbine nozzle cooling air 330 generally parallel to hot gas flow path 325 undesirable hot gas injection into gap 182 is prevented or limited.

Additionally, in the exemplary embodiment at least a portion 380 of mixed cooling air 320 is directed into recuperated cooling openings 370 to facilitate convection cooling leading edge 133 of shroud segment 130. More specifically, as portion 380 of mixed cooling air 320 is directed through each recuperated cooling opening 370, portion 380 cools leading edge 133 through convection.

Figure 6:
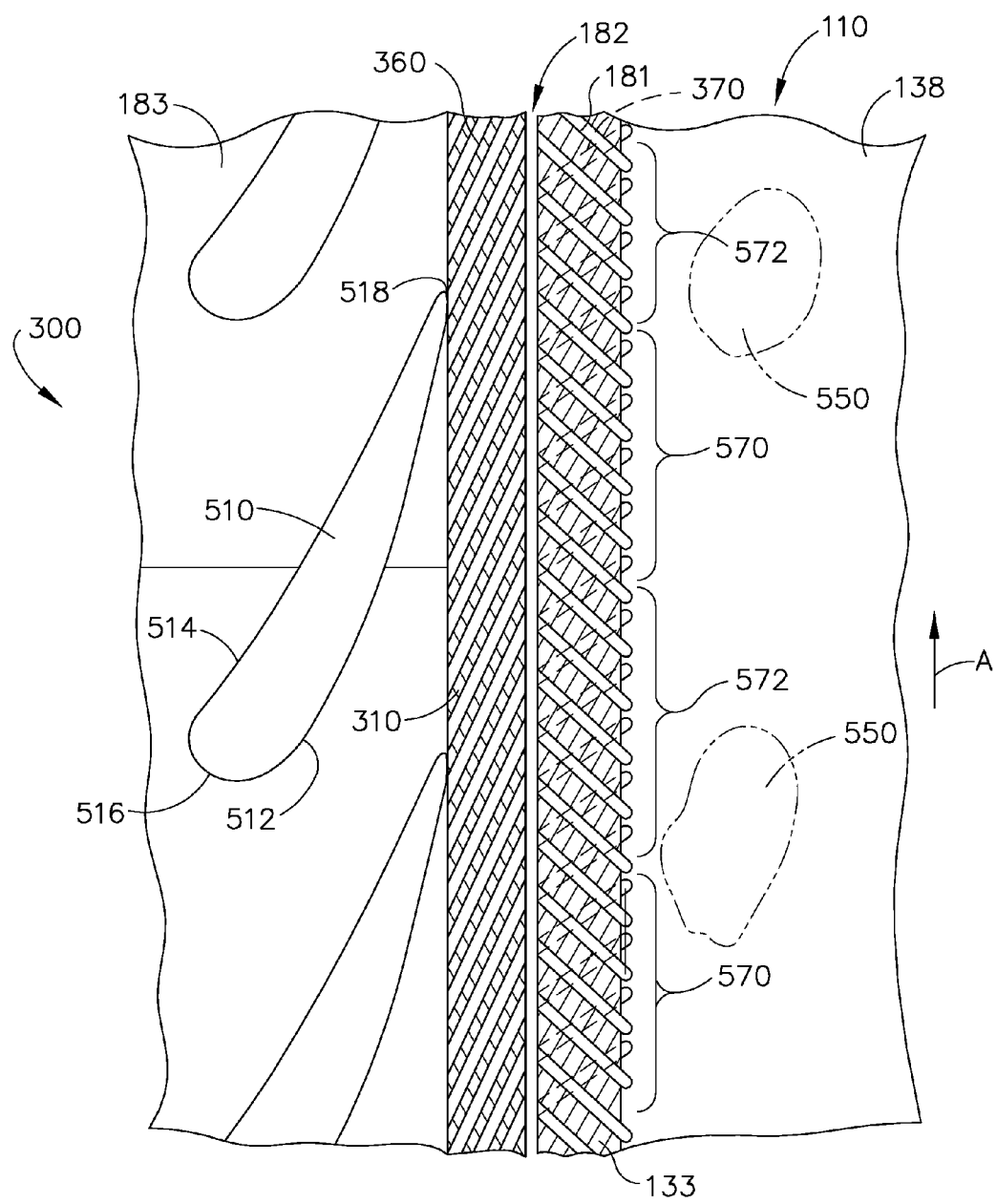
FIG. 6 is a plan view of the turbine nozzle and shroud assembly shown in FIG. 3, illustrating an alternative exemplary cooling opening pattern.

FIG. 5 is a plan view of turbine nozzle and shroud assembly 300 shown in FIG. 3, illustrating an exemplary cooling opening pattern. FIG. 6 is a plan view of turbine nozzle and shroud assembly 300 shown in FIG. 3, illustrating an alternative exemplary cooling opening pattern. As shown in FIG. 5, turbine nozzle and shroud assembly 300 defines gap 182 between turbine nozzle trailing edge 310 and shroud segment leading edge 133. Turbine nozzle 302 generally includes a plurality of circumferentially-spaced airfoil vanes 510 that extend radially outward from an inner band (not shown) to radial outer band 183. Discharge openings 360 are oriented to facilitate metering spent turbine nozzle cooling air 330 towards shroud segment leading edge 133 and to facilitate purging gap 182 of migrating hot gases.

As shown in FIG. 5, discharge openings 360 extend obliquely through aft flange 316 and forwardly directed cooling openings 181 extend obliquely through shroud segment leading edge 133. In the exemplary embodiment, each nozzle segment 302 includes at least one airfoil vane 510 that includes a first sidewall 512 and a second sidewall 514. First sidewall 512 is convex and defines a suction side of each airfoil vane 510, and second sidewall 514 is concave and defines a pressure side of each airfoil vane 510. Sidewalls 512 and 514 are joined together at a leading edge 516 and at an axially-spaced trailing edge 518 of each airfoil vane 510. Each airfoil trailing edge 518 is spaced chordwise and downstream from each respective airfoil leading edge 516. First and second sidewalls 512 and 514, respectively, extend longitudinally, or radially outwardly, in span from a radially inner band (not shown) to radially outer band 183.

Each vane 510 has airfoil contours from leading edge 516 toward trailing edge 518. As the hot combustion gases flow around airfoil vanes 510, the gases along sidewall 512 accelerate and create a lower static pressure and the gases along sidewall 514 decelerate and create a higher static pressure. During engine operation, hot combustion gases are channeled between vanes 510 and bands 183 and form a pair of passage vortices from sidewall 514 towards sidewall 512 on the surfaces of the inner band (not shown) and outer band 183. The passage vortices bring the hotter combustion gases from the mid-span core flow toward the inner band (not shown) and outer band 183. There are periodic pressure variations along the circumferential direction at trailing edge 31 0. The combination of the passage vortex and the circumferential pressure variation at leading edge 133 results in circumferentially periodic local hot spots 550 developing on radial inner surface 138. Over time, such hot spots 550 may reduce an overall performance of the engine assembly and/or reduce a durability of the engine.

Discharge openings 360 are obliquely-oriented in outer band aft flange 316 relative to trailing edge 310 such that spent turbine nozzle cooling air 330 discharged from discharge openings 360 is discharged at a discharge angle $\alpha$ with respect to a centerline 555 defined in gap 182 and in the direction of rotation indicated by arrow A. In the exemplary embodiment, discharge angle $\alpha$ is oblique and as such is not parallel to hot gas flow path 325 through the gas turbine engine. More specifically, in this embodiment all discharge openings 360 are obliquely-oriented at the same discharge angle $\alpha$. In alternative embodiments, discharge openings 360 are uniformly obliquely-oriented at any discharge angle $\alpha$ that enables discharge openings 360 to function as described herein. In the exemplary embodiment, discharge openings 360 are spaced circumferentially equidistantly about outer band trailing edge 310. Moreover, in the exemplary embodiment, discharge openings 360 are all sized and obliquely-oriented identically. It should be appreciated that although discharge openings 360 illustrated in the exemplary embodiment are sized identically and are uniformly spaced about trailing edge 310, in alternative embodiments, discharge openings 360 may have any size, shape and/or orientation that enables discharge openings 360 to function as described herein.

In the exemplary embodiment, forwardly directed cooling openings 181 extend through shroud assembly leading edge 133 and are obliquely-oriented to discharge spent impingement cooling air 180 at a discharge angle $\beta$ measured with respect to centerline 555 of gap 182. In this embodiment, discharge angle $\beta$ is oblique and as such spent impingement cooling air 180 discharged from openings 181 is not parallel to hot gas flow path 325 through the gas turbine engine. More specifically, forwardly directed cooling openings 181 are uniformly obliquely-oriented at discharge angle $\beta$ in the direction of arrow A. In alternative embodiments, forwardly directed cooling openings 181 may be uniformly obliquely-oriented at any discharge angle $\beta$ that enables forwardly directed cooling openings 181 to function as described herein. In the exemplary embodiment, forwardly directed cooling openings 181 are spaced circumferentially equidistantly about shroud assembly leading edge 133. Moreover, forwardly directed cooling openings 181 are all sized and oriented identically. It should be appreciated that although forwardly directed cooling openings 181 illustrated in the exemplary embodiment are sized identically and are uniformly spaced about leading edge 133, in alternative embodiments, forwardly directed cooling openings 181 may have any size, shape and/or orientation that enables forwardly directed cooling openings 181 to function as described herein.

In the exemplary embodiment, discharge openings 360 are each substantially aligned with a respective forwardly directed cooling opening 181 located across gap 182. It should be appreciated that although discharge openings 360 are substantially aligned with respective forwardly directed cooling openings 181 in the exemplary embodiment, in alternative embodiments, discharge openings 360 are not required to align with respective forwardly directed cooling openings 181, and instead may be offset by any distance from respective forwardly directed cooling openings 181 that enables discharge openings 360 and forwardly directed cooling openings 181 to function as described herein. Additionally, although angles α and β are described as having the same magnitude in the exemplary embodiment, in alternative embodiments, discharge openings 360 and/or forwardly directed cooling openings 181 may be oriented at different angles α and β, respectively.

During operation, the oblique orientation of discharge openings 360 and forwardly directed cooling openings 181 imparts a clockwise, or tangential, velocity component to cooling air channeled or metered through discharge openings 360 and forwardly directed cooling openings 181. As a result, cooling flow energy is facilitated to be enhanced because no energy is lost in turning the cooling air through misaligned openings. Moreover, the clockwise momentum of the cooling air facilitates balancing the pressure distribution inside gap 182 such that hot gas ingestion into gap 182 is reduced.

Moreover, the oblique orientation and location of discharge openings 360 and forwardly directed cooling openings 181 about turbine nozzle and shroud assembly 300 facilitates reducing hot gas ingestion into gap 182 and facilitates improving film cooling of radial inner surface 138 downstream from leading edge 133. Moreover, the orientation and location of discharge openings 360 and forwardly directed cooling openings 181 facilitates increasing the length of discharge openings 360 and forwardly directed cooling openings 181, thus increasing the convective cooling ability of discharge openings 360 and forwardly directed cooling openings 181 within turbine nozzle and shroud assembly 300.

Referring further to FIG. 5, recuperated cooling openings 370 extend through shroud assembly leading edge 133 and are obliquely-oriented to direct mixed cooling air portion 380 through recuperated cooling openings 370 at an oblique inlet angle γ measured with respect to centerline 555 of gap 182. In the exemplary embodiment, inlet angle γ is oblique and as such flow directed into recuperated cooling openings 370 is not parallel to hot gas flow path 325 through the gas turbine engine. More specifically, in the exemplary embodiment, recuperated cooling openings 370 are uniformly obliquely-oriented at inlet angle γ in the direction of arrow A. In alternative embodiments, recuperated cooling openings 370 are uniformly obliquely-oriented at any inlet angle γ that enables recuperated cooling openings 370 to function as described herein.

In the exemplary embodiment, recuperated cooling openings 370 are preferentially distributed circumferentially about leading edge 133 to define a plurality of recuperated cooling opening groups, such as recuperated cooling opening group(s) 570 (shown in FIGS. 5 and 6) and/or recuperated cooling opening group(s) 572 (shown in FIG. 6). Each recuperated cooling opening group 570 and 572 includes any suitable number of recuperated cooling openings 370 having an aggregate cross-sectional area. References to the term "aggregate cross-sectional area" throughout the specification and in the claims are to be understood to refer to a summation of the cross-sectional area of recuperated cooling openings 370 defined on forward face 304 or, in an alternative embodiment within gap plenum 402. Thus, the aggregate cross-sectional area can be substantially similar throughout recuperated cooling opening groups 570 and 572 or can be different as a result of the number of recuperated cooling openings 370 defined within a specific recuperated cooling opening group 570 and/or 572 and/or a density of recuperated cooling openings 370 defined within the specific recuperated cooling opening group 570 and/or 572.

In one embodiment, referring to FIGS. 5 and 6, at least one recuperated cooling opening group 570 is configured to facilitate enhanced cooling air flow to hotter portions 550 of shroud segment 130 at or near leading edge 133. Additionally or alternatively, at least one recuperated cooling opening group 572, as shown in FIG. 6, is configured to facilitate reducing cooling air flow to cooler portions of shroud segment 130 at or near leading edge 133. In this embodiment, recuperated cooling opening group 570 includes recuperated cooling openings 370 having a first diameter and recuperated cooling opening group 572 includes recuperated cooling openings 370 having a second diameter different from the first diameter, such as a relatively smaller diameter. Additionally or alternatively, recuperated cooling opening group 570 has a first density of recuperated cooling openings 370 and recuperated cooling opening group 572 has a second density of recuperated cooling openings 370 different from the first density.

Referring further to FIG. 6, recuperated cooling openings 370 extend obliquely through shroud assembly leading edge 133 in two recuperated cooling opening groups 570 and 572. During operation, hot spots 550 may develop on radial inner surface 138 that may require enhanced local cooling. Consequently, in this alternative embodiment, at least one recuperated cooling opening group 570 of larger diameter recuperated cooling openings 370 is positioned upstream from each corresponding hot spot 550. Concentrated or preferentially distributed recuperated cooling openings 370 in recuperated cooling opening group 570 facilitate preferential convection cooling of leading edge 133 as well as preferential film cooling of radial inner surface 138 at or near hot spots 550. By directing mixed cooling air portion 380 from gap 182 through recuperated cooling openings 370, shroud segment leading edge 133 at or near leading edge corner 306 is cooled through convection. Further, mixed cooling air portion 380 is discharged through discharges 374 of recuperated cooling openings 370 towards corresponding hot spot 550 to facilitate film cooling radial inner surface 138 at or near corresponding hot spot 550.

In an alternative embodiment, recuperated cooling openings 370 are spaced circumferentially equidistantly about shroud assembly leading edge 133. Moreover, in further alternative embodiments, recuperated cooling openings 370 are all sized and oriented identically. It should be appreciated that although recuperated cooling openings 370 illustrated in the exemplary embodiment are sized identically, in alternative embodiments, recuperated cooling openings 370 may have any size, shape and/or orientation that enables recuperated cooling openings 370 to function as described herein.

It should be appreciated that a location of hot spot 550 may vary between engines and, as a result, a corresponding location of recuperated cooling opening groups 570 and/or 572 will vary, accordingly. In the exemplary embodiment, recuperated cooling opening groups 572 of small diameter recuperated cooling openings 370 are positioned between circumferentially-spaced recuperated cooling opening groups 570 of larger diameter recuperated cooling openings 370, as shown in FIG. 6. More specifically, the relative location of smaller diameter recuperated cooling openings 370 corresponds to an area on radial inner surface 138 that is downstream from leading edge 133 and that is subjected to relatively lower operating temperatures in comparison to hot spots 550. Thus, in the embodiment shown in FIG. 6, recuperated cooling opening groups 570 and 572 may be positioned to enhance a flow of cooling air provided to hotter regions of radial inner surface 138 while minimizing a flow of cooling air provided to cooler regions of radial inner surface 138, thereby facilitating reducing hot spot development on radial inner surface 138.

In a further alternative embodiment, recuperated cooling opening patterns for recuperated cooling openings 370 are preferentially distributed with respect to leading edge 133 to facilitate preferentially cooling shroud assembly 110. More specifically, groups 570 of larger diameter recuperated cooling openings 370 are positioned upstream from each corresponding hot spot 550 to facilitate preferential cooling hot spots 550 by directing cooling air towards corresponding hot spot 550. Group 570 may vary in location depending upon the location of corresponding hot spot 550 on radial inner surface 138. Additionally, groups 572 of small diameter recuperated cooling opening 370 are positioned between circumferentially-spaced groups 570 of large diameter recuperated cooling openings 370. The relative locations of smaller diameter groups 572 correspond to areas of radial inner surface 138 that are downstream from leading edge 133 and that are subjected to relatively lower temperatures in comparison to hot spots 550. Thus, groups 570 and groups 572 of recuperated cooling openings 370 may be positioned to enhance a flow of cooling air provided to hotter regions of radial inner surface 138 while minimizing a flow of cooling air provided to cooler regions of radial inner surface 138, thereby reducing hot spot development on radial inner surface 138.

Large diameter recuperated cooling openings 370 and/or small diameter recuperating cooling openings 370 may have any suitable diameter that enables groups 570 and groups 572, respectively, to function as described herein.

It should be appreciated that although the aforementioned exemplary embodiments describe patterns of recuperated cooling openings 370, alternative embodiments may use different patterns of recuperated cooling openings 370 within respective groups 570 and/or 572. More specifically, alternative embodiments may facilitate preferential cooling hot spots 550 by adjusting, in any manner, the aggregate cross-sectional area available for directing cooling air to hot spots 550 through each group 570 and/or 572 of recuperated cooling openings 370. For example, alternative embodiments may use the same diameter for recuperated cooling openings 370 within respective groups 570 and 572, and at the same time increase or decrease the density of recuperated cooling openings 370 within the respective groups 570 or 572. Consequently, to increase cooling air flow through group 570 or 572 the density of respective recuperated cooling openings 370 is increased. To decrease cooling flow through group 570 or 572, the density of respective recuperated cooling openings 370 is decreased. Thus, by adjusting the density of recuperated cooling openings 370 within respective group 570 and/or 572, the aggregate cross-sectional area is also adjusted to facilitate preferential cooling hot spots 550.

In another example of adjusting the aggregate cross-sectional area provided for directing cooling air, groups 570 may include any number of large diameter recuperated cooling openings 370 at any cooling opening spacing that enables groups 570 to function as described herein. Likewise, groups 572 may include any number of small diameter recuperated cooling openings 370 at any cooling opening spacing that enables groups 572 to function as described herein. In a further example, groups 570 may include an increased density of large diameter recuperated cooling openings 370 and/or groups 572 may include a decreased density of small diameter recuperated cooling openings 370 that enables groups 570 and 572 to function as described herein.

Although the exemplary embodiments describe recuperated cooling openings 370 as having circular cross-sections, in alternative embodiments recuperated cooling openings 370 have any suitable cross-sectional area, such as an oval, square or rectangle cross-sectional area.

In further alternative embodiments, cooling opening patterns for discharge openings 360 and/or forwardly directed cooling openings 181 are preferentially distributed with respect to leading edge 133 to facilitate preferentially cooling shroud assembly 1 10. More specifically, a group of larger diameter discharge openings 360 and/or forwardly directed cooling openings 181 are positioned upstream from each corresponding hot spot 550 to facilitate preferential cooling shroud assembly 110 by directing cooling air towards each corresponding hot spot 550. These groups may be positioned to cooperate with each other across opposite sides of gap 182. Further, these groups may vary in location depending upon the location of corresponding hot spot 550 on radial inner surface 138. Additionally, groups of small diameter discharge openings 360 and/or forwardly directed cooling openings 181 are positioned between circumferentially-spaced groups of large diameter discharge openings 360 and/or forwardly directed cooling openings 181, respectively. The relative locations of these smaller diameter groups correspond to areas of radial inner surface 138 that are downstream from leading edge 133 and that are subjected to relatively lower temperatures in comparison to hot spots 550. Thus, groups of large diameter and smaller diameter discharge openings 360 and/or groups of larger diameter and smaller diameter forwardly directed cooling openings 181 may be positioned to enhance a flow of cooling air provided to hotter regions of radial inner surface 138 while minimizing a flow of cooling air provided to cooler regions of radial inner surface 138, thereby reducing hot spot development on radial inner surface 138.

Large diameter discharge openings 360 and/or forwardly directed cooling openings 181 and/or small diameter discharge openings 360 and/or forwardly directed cooling openings 181 may have any suitable diameter that enables discharge openings 360 and/or forwardly directed cooling openings 181 to function as described herein.

Although the aforementioned exemplary embodiments describe patterns of discharge openings 360 and/or forwardly directed cooling openings 181, alternative embodiments may use different patterns of discharge openings 360 and/or forwardly directed cooling openings 181 within respective groups. More specifically, alternative embodiments may facilitate preferential cooling hot spots 550 by adjusting, in any manner, the aggregate cross-sectional area available for directing cooling air to hot spots 550 within each group of discharge openings 360 and/or each group of forwardly directed cooling openings 181. For example, alternative embodiments may use the same diameter for discharge openings 360 and/or forwardly directed cooling openings 181 within respective groups, and at the same time increase or decrease the density of discharge openings 360 and/or forwardly directed cooling openings 181 within the respective groups. Consequently, to increase cooling flow through any group the density of respective discharge openings 360 and/or forwardly directed cooling openings 181 is increased. To decrease cooling flow through any group, the density of respective discharge openings 360 and/or forwardly directed cooling openings 181 is decreased. Thus, by adjusting the density of discharge openings 360 and/or forwardly directed cooling openings 181 within the respective group, the aggregate cross-sectional area is also adjusted to facilitate preferential cooling hot spots 550.

Further, the aggregate cross-sectional area may be adjusted to include any suitable number of large diameter discharge openings 360 and/or forwardly directed cooling openings 181 at any cooling opening spacing. Similarly, the groups may include any suitable number of small diameter discharge openings 360 and/or forwardly directed cooling openings 181 at any cooling opening spacing. The aggregate cross-sectional area may also be adjusted such that selected groups include an increased density of large diameter discharge openings 360 and/or forwardly directed cooling openings 181 and/or the selected groups include a decreased density of small diameter discharge openings 360 and/or forwardly directed cooling openings 181.

Although the exemplary embodiments describe discharge openings 360 and/or forwardly directed cooling openings 181 as having circular cross-sectional areas, in alternative embodiments, discharge openings 360 and/or forwardly directed cooling openings 181, such as described above in reference to recuperated cooling openings 370.

The above-described turbine shroud cooling assembly includes preferentially distributed recuperated cooling openings positioned circumferentially about the leading edge of the shroud segment to facilitate convection cooling the shroud leading edge as well as film cooling a downstream radial inner surface of the shroud segment.

Exemplary embodiments of methods and assemblies for preferentially cooling turbine shroud assemblies are described above in detail. The methods and assemblies are not limited to the specific embodiments described herein, but rather, steps of the methods and/or components of the assemblies may be utilized independently and separately from method steps and/or other assembly components described herein.

While the invention has been described in terms of various specific embodiments, those skilled in the art will recognize that the invention can be practiced with modification within the spirit and scope of the claims.

What is claimed is:

1. A method of assembling a gas turbine engine, said method comprising:
    coupling a turbine shroud assembly within the gas turbine engine, wherein the turbine shroud assembly includes a shroud segment having a leading edge defining a forward face and a radial inner surface;
    coupling a turbine nozzle to the turbine shroud assembly such that a gap is defined between an aft face of an outer band of the turbine nozzle and the forward face; and
    defining a plurality of recuperated cooling openings through the leading edge at an oblique inlet angle with respect to a centerline of the gap and between the forward face and the radial inner surface to direct cooling fluid through the leading edge to facilitate preferential cooling of the leading edge wherein defining further comprises defining a plurality of recuperated cooling opening groups, wherein each of the recuperated cooling opening groups includes a plurality of recuperated cooling openings having an aggregate cross-sectional area.

2. A method in accordance with claim 1 further comprising directing cooling fluid through a first recuperated cooling opening group to facilitate enhanced cooling of hotter portions of the shroud segment.

3. A method in accordance with claim 2 further comprising directing cooling fluid through a second recuperated cooling opening group to facilitate reduced cooling fluid flow to cooler portions of the shroud segment at or near the leading edge.

4. A method in accordance with claim 3 further comprising forming the first recuperated cooling opening group from a plurality of recuperated cooling openings each having a first diameter and forming the second recuperated cooling opening group from a plurality of recuperated cooling openings each having a second diameter different from the first diameter.

5. A method in accordance with claim 3 further comprising forming the first recuperated cooling opening group having a first density of recuperated cooling openings and forming the second recuperated cooling opening group having a second density of recuperated cooling openings different from the first density.

6. A method in accordance with claim 1 further comprising coupling a cooling fluid source in flow communication with the turbine shroud segment such that spent impingement cooling fluid is metered into the gap through a plurality of forwardly directed cooling openings extending through the forward face at an oblique discharge angle with respect to the centerline.

7. A method in accordance with claim 6 further comprising metering cooling fluid through at least a first group of forwardly directed cooling openings having a larger aggregate cross-sectional area and a second group of forwardly directed cooling openings having a smaller aggregate cross-sectional area to facilitate preferential convection cooling of the shroud segment.

8. A method in accordance with claim 7 further comprising positioning the second group of shroud segment cooling openings within a corresponding recuperated cooling opening group.

9. A method in accordance with claim 1 further comprising coupling a cooling fluid source in flow communication with the turbine nozzle such that spent turbine nozzle cooling fluid is channeled towards the forward face through a plurality of discharge openings extending through the aft face at an oblique discharge angle with respect to the centerline.

10. A turbine nozzle and shroud assembly for a gas turbine engine, said turbine nozzle and shroud assembly comprising:
    a shroud segment comprising a leading edge defining a forward face and a radial inner surface, said shroud segment further defining a plurality of recuperated cooling openings extending obliquely through said leading edge between said forward face and said radial inner surface wherein an inlet of each recuperated cooling opening is defined within said forward face and a discharge of each recuperated cooling opening is defined within said radial inner surface; and
    a turbine nozzle comprising an outer band comprising a trailing edge defining an aft face of said outer band, said turbine nozzle upstream from said shroud segment and coupled with said shroud segment such that a gap is defined between said aft face and said forward face, said gap configured to direct cooling fluid towards a hot gas flow path flowing through the gas turbine engine.

11. A turbine nozzle and shroud assembly in accordance with claim 10 further comprising a circumferential gap plenum defined on said forward face, each said inlet defined within said gap plenum.

12. A turbine nozzle and shroud assembly in accordance with claim 10 wherein said plurality of recuperated cooling openings defines a plurality of recuperated cooling opening groups, each of said recuperated cooling opening groups comprising a plurality of recuperated cooling openings having an aggregate cross-sectional area.

13. A turbine nozzle and shroud assembly in accordance with claim 12 further comprising at least one first recuperated cooling opening group configured to facilitate enhanced cooling of hotter portions of the shroud segment.

14. A turbine nozzle and shroud assembly in accordance with claim 13 further comprising a plurality of forwardly directed cooling openings extending obliquely through said forward face, said plurality of forwardly directed cooling openings providing fluid communication between a cooling fluid source and said gap such that cooling fluid is channeled into said gap through said plurality of forwardly directed cooling openings at an oblique discharge angle, at least a first group of forwardly directed cooling openings having a first aggregate cross-sectional area and a second group of forwardly directed cooling openings having a second aggregate cross-sectional area different from the first aggregate cross-sectional area.

15. A turbine nozzle and shroud assembly in accordance with claim 14 wherein said second group of shroud segment cooling openings is positioned within a corresponding recuperated cooling opening group.

16. A turbine nozzle and shroud assembly in accordance with claim 14 further comprising a plurality of discharge openings extending obliquely through said aft face, said plurality of discharge openings providing fluid communication between a cooling fluid source and said gap such that spent turbine nozzle cooling fluid is channeled towards said forward face through said plurality of discharge openings at an oblique discharge angle, a first group of discharge openings having a first aggregate cross-sectional area and a second group of discharge openings having a second aggregate cross-sectional area different from the first aggregate cross-sectional area.

17. A cooling system for a gas turbine engine, the gas turbine engine comprising a shroud segment having a leading edge defining a forward face, and a turbine nozzle comprising an outer band having a trailing edge defining an aft face, said outer band defining a first group of discharge openings having a first aggregate cross-sectional area and a second group of discharge openings having a second aggregate cross-sectional area different from the first aggregate cross-sectional area, the turbine nozzle positioned upstream of the shroud segment and coupled with a turbine shroud assembly such that a gap is defined between the aft face and the forward face, the gap configured to direct cooling fluid towards a hot gas flow path flowing through the gas turbine engine, said shroud segment further defines a first group of forwardly directed cooling openings having a third aggregate cross-sectional area and a second group of forwardly directed cooling openings having a fourth aggregate cross-sectional area different from the third aggregate cross-sectional area, said cooling system configured to:

direct a portion of cooling fluid through a plurality of recuperated cooling openings extending through the leading edge at an oblique inlet angle with respect to a centerline of the gap and between the forward face and the radial inner surface to facilitate preferential cooling of the leading edge; and direct spent turbine nozzle cooling air through the discharge openings at an oblique discharge angle with respect to the gap and direct spent impingement cooling through the forwardly directed cooling openings at an oblique angle with respect to the gap to facilitate preferentially cooling the shroud segment.

* * * * *